US012735328B2

(12) United States Patent
Yang et al.

(10) Patent No.: US 12,735,328 B2
(45) Date of Patent: Sep. 15, 2026

(54) NIOBIUM OXIDE PARTICLES AND METHOD FOR PRODUCING NIOBIUM OXIDE PARTICLES

(71) Applicant: DIC Corporation, Tokyo (JP)

(72) Inventors: Shaowei Yang, Qingdao (CN); Jianjun Yuan, Chiba (JP); Masafumi Uota, Chiba (JP); Mutsuko Tange, Chiba (JP); Cheng Liu, Qingdao (CN); Meng Li, Qingdao (CN); Wei Zhao, Qingdao (CN); Jian Guo, Qingdao (CN)

(73) Assignee: DIC Corporation, Tokyo (JP)

( * ) Notice: Subject to any disclaimer, the term of this patent is extended or adjusted under 35 U.S.C. 154(b) by 567 days.

(21) Appl. No.: 18/254,059

(22) PCT Filed: Dec. 8, 2020

(86) PCT No.: PCT/CN2020/134567

§ 371 (c)(1),
(2) Date: May 23, 2023

(87) PCT Pub. No.: WO2022/120578

PCT Pub. Date: Jun. 16, 2022

(65) Prior Publication Data

US 2024/0092653 A1 Mar. 21, 2024

(51) Int. Cl.
*C01G 33/00* (2006.01)
*C01G 39/02* (2006.01)

(52) U.S. Cl.
CPC ............ *C01G 33/00* (2013.01); *C01G 39/02* (2013.01); *C01P 2002/85* (2013.01);
(Continued)

(58) Field of Classification Search
CPC ..... C01G 33/00; C01G 39/02; C01P 2002/85; C01P 200/54; C01P 200/61; C01P 200/62
See application file for complete search history.

(56) References Cited

U.S. PATENT DOCUMENTS 7,618,610 B2 * 11/2009 Thomas .............. C04B 35/6265
423/594.17
2005/0013765 A1 1/2005 Thomas et al.
(Continued)

FOREIGN PATENT DOCUMENTS

CN 1576235 A 2/2005
CN 100441515 C 12/2008
(Continued)

OTHER PUBLICATIONS

Usha, N., et al. "Mixed Nb2O5: MoO3 (95: 5 and 85: 15) thin films and their properties for electrochromic device applications." Journal of Materials Science: Materials in Electronics 27.8 (2016): 7809-7821. (Year: 2016).*

(Continued)

*Primary Examiner* — Richard M Rump
(74) *Attorney, Agent, or Firm* — Rimon P.C.

(57) ABSTRACT

Niobium oxide particles which have a controlled crystal shape and exhibit excellent characteristics are provided. The niobium oxide particles include molybdenum. The niobium oxide particles preferably have a polyhedral, columnar or acicular shape. The $MoO_3$ content ($M_1$) measured by XRF analysis of the niobium oxide particles is preferably 0.1 to 40 mass % relative to the niobium oxide particles taken as 100 mass %. A method for producing the niobium oxide particles described above includes calcining a niobium compound in the presence of a molybdenum compound.

9 Claims, 6 Drawing Sheets

EXAMPLE 1

(52) U.S. Cl.
CPC ...... *C01P 2004/54* (2013.01); *C01P 2004/61* (2013.01); *C01P 2004/62* (2013.01); *C01P 2004/82* (2013.01)

(56) References Cited

U.S. PATENT DOCUMENTS

| | | | | |
|---|---|---|---|---|
| 2007/0178040 | A1 | 8/2007 | Kikuyama et al. | |
| 2008/0291605 | A1 | 11/2008 | Thomas et al. | |
| 2011/0003085 | A1 | 1/2011 | Hugener-Campbell et al. | |
| 2013/0006030 | A1 | 1/2013 | Ahmed et al. | |
| 2020/0152963 | A1 * | 5/2020 | Zhang ................. | H01M 4/0404 |

FOREIGN PATENT DOCUMENTS

| | | | |
|---|---|---|---|
| CN | 103449520 | A | 12/2013 |
| CN | 104190404 | A | 12/2014 |
| CN | 109244443 | A | 1/2019 |
| CN | 111850739 | A | 10/2020 |
| JP | 2003-267728 | A | 9/2003 |
| JP | 2005-200235 | A | 7/2005 |
| JP | 2005-255454 | A | 9/2005 |
| KR | 10-2005-0008488 | A | 1/2005 |

OTHER PUBLICATIONS

International Search Report and Written Opinion issued in corresponding International Application No. PCT/CN2020/134567 dated Sep. 9, 2021 (8 pages).
Chary et al., "Dispersion and reactivity of Mo/Nb2O5 catalysts in the ammoxidation of toluene to benzonitrile", Komandur V. R. Green Chemistry, 206-209, Mar. 8, 2022.

* cited by examiner

EXAMPLE 1

EXAMPLE 2

EXAMPLE 3

EXAMPLE 4

EXAMPLE 5

EXAMPLE 7

COMPARATIVE EXAMPLE 1

COMPARATIVE EXAMPLE 2

NIOBIUM OXIDE PARTICLES AND METHOD FOR PRODUCING NIOBIUM OXIDE PARTICLES

CROSS REFERENCE TO RELATED APPLICATIONS

This application is the U.S. National Phase under 35 U.S.C. § 371 of International Application No. PCT/CN2020/134567, filed on Dec. 8, 2020, the entire contents of each are hereby incorporated by reference.

TECHNICAL FIELD

The present invention relates to niobium oxide particles and to a method for producing niobium oxide particles.

BACKGROUND ART

Niobium oxide has excellent properties such as dielectric characteristics, solid acidity and high refractive index, and also exhibits very high stability against chemicals and other materials, thus finding wide use as, for example, electronic ceramic materials such as capacitors, dielectric materials and piezoelectric materials, heat resistant alloy materials, optical glass materials, catalyst materials and electronic materials.

PTL 1 discloses a method for producing niobium oxide microparticles in which niobium chloride is volatilized at a temperature of 170 to 240° C., and water vapor is added to the resultant feedstock stream of niobium chloride vapor to hydrolyze niobium chloride, thereby obtaining in the stream niobium oxide microparticles having a particle size of not more than 1.0 μm.

PTL 2 discloses a method for producing a niobium oxide sol in which citric acid is added to a niobium oxide sol stabilized by oxalic acid, then an aqueous ammonia solution is added to adjust the pH to 7 to 10, and subsequently oxalic acid is removed.

PTL 3 discloses a method for producing tantalum oxide and/or niobium oxide in which a basic aqueous solution is added to an aqueous solution of a tantalum fluoride salt and/or a niobium fluoride salt to form tantalum hydroxide and/or niobium hydroxide, and then the tantalum hydroxide and/or the niobium hydroxide is calcined to form tantalum oxide and/or niobium oxide having an acicular or columnar crystal shape.

CITATION LIST

Patent Literature

[PTL 1]
Japanese Unexamined Patent Application Publication No. 2003-267728
[PTL 2]
Japanese Unexamined Patent Application Publication No. 2005-200235
[PTL 3]
Japanese Unexamined Patent Application Publication No. 2005-255454

SUMMARY OF INVENTION

Technical Problem

Controlling of the crystal shape of niobium oxide particles broadens the versatility of niobium oxide particles and is hence an especially important technique. Unfortunately, the methods disclosed in PTL 2 and PTL 3 are special solution processes which are complicated to carry out. The method disclosed in PTL 1 can hardly control the shape of the particles.

The present invention has been made in order to overcome the problems described hereinabove. It is therefore an object of the present invention to provide niobium oxide particles which have a controlled crystal shape and exhibit excellent characteristics.

Solution to Problem

The present inventors carried out extensive studies directed to achieving the above object, and have consequently found that the use of a molybdenum compound as a flux facilitates controlling of the crystal shape of niobium oxide particles that are produced, and have also found that niobium oxide particles thus produced contain molybdenum. The present invention has been completed based on the findings.

Specifically, aspects of the present invention include the following.

(1) Niobium oxide particles including molybdenum.

(2) The niobium oxide particles described in (1), wherein the longer diameter is 0.1 to 300 μm.

(3) The niobium oxide particles described in (1) or (2), which have a polyhedral, columnar or acicular shape.

(4) The niobium oxide particles described in any one of (1) to (3), wherein the aspect ratio represented by longer diameter/shorter diameter is not less than 2.

(5) The niobium oxide particles described in any one of (1) to (4), wherein the $MoO_3$ content ($M_1$) measured by XRF analysis of the niobium oxide particles is 0.1 to 40 mass % relative to the niobium oxide particles taken as 100 mass %.

(6) The niobium oxide particles described in any one of (1) to (5), wherein the molybdenum is selectively rich in a superficial layer of the niobium oxide particles.

(7) The niobium oxide particles described in any one of (1) to (6), wherein the $MoO_3$ content ($M_2$) measured by XPS surface analysis of the niobium oxide particles is 0.5 to 45 mass % relative to a superficial layer of the niobium oxide particles taken as 100 mass %.

(8) The niobium oxide particles described in any one of (1) to (7), wherein the specific surface area measured by a BET method is less than 10 $m^2/g$.

(9) A method for producing niobium oxide particles described in any one of (1) to (8), including:

calcining a niobium compound in the presence of a molybdenum compound.

(10) The method described in (9) for producing niobium oxide particles, wherein the niobium compound is calcined at a calcination temperature of 800 to 1500° C.

(11) The method described in (9) or (10) for producing niobium oxide particles, wherein the molar ratio molybdenum/niobium of molybdenum atoms in the molybdenum compound to niobium atoms in the niobium compound is not less than 0.01.

Advantageous Effects of Invention

The niobium oxide particles provided according to the present invention have excellent characteristics stemming from molybdenum and have a controlled crystal shape.

DESCRIPTION OF EMBODIMENTS

Figure 1:
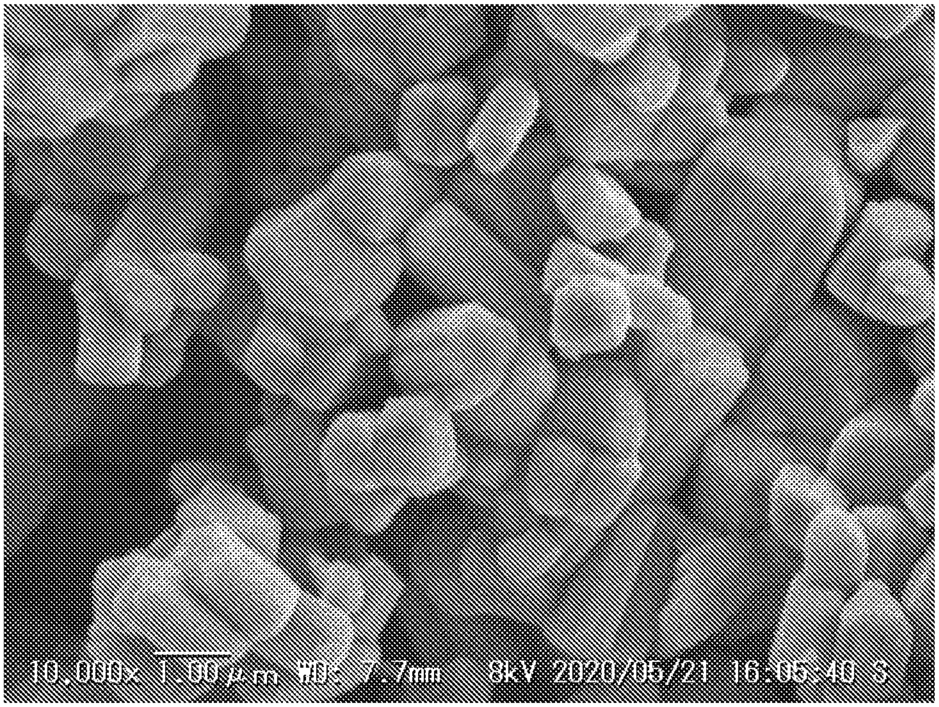
FIG. 1 is a SEM image of niobium oxide particles of EXAMPLE 1.
Figure 2:
FIG. 2 is a SEM image of niobium oxide particles of EXAMPLE 2.
Figure 3:
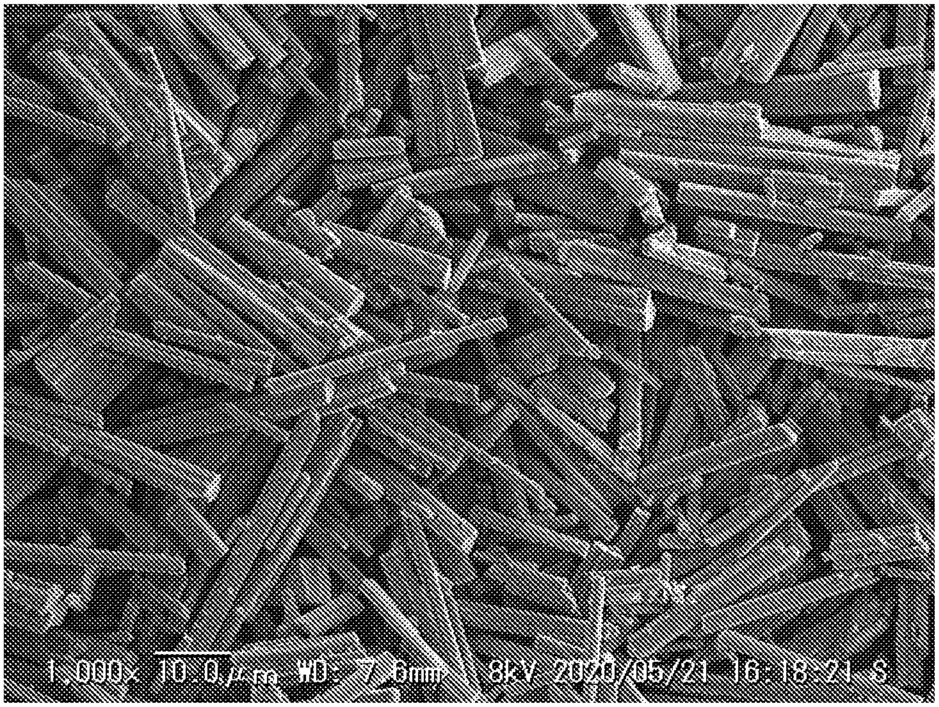
FIG. 3 is a SEM image of niobium oxide particles of EXAMPLE 3.
Figure 4:
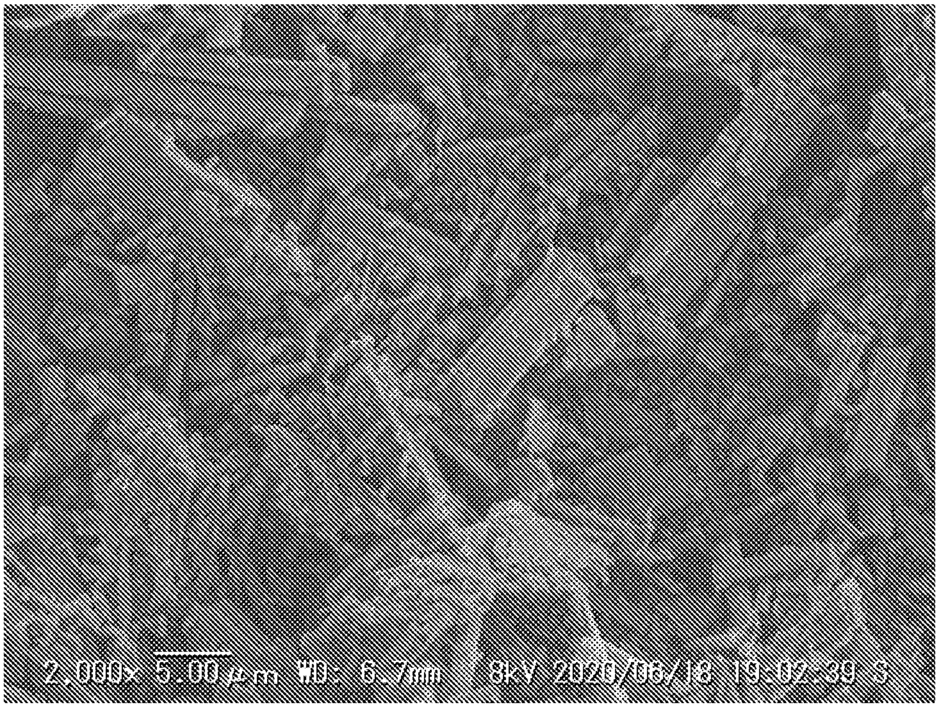
FIG. 4 is a SEM image of niobium oxide particles of EXAMPLE 4.
Figure 5:
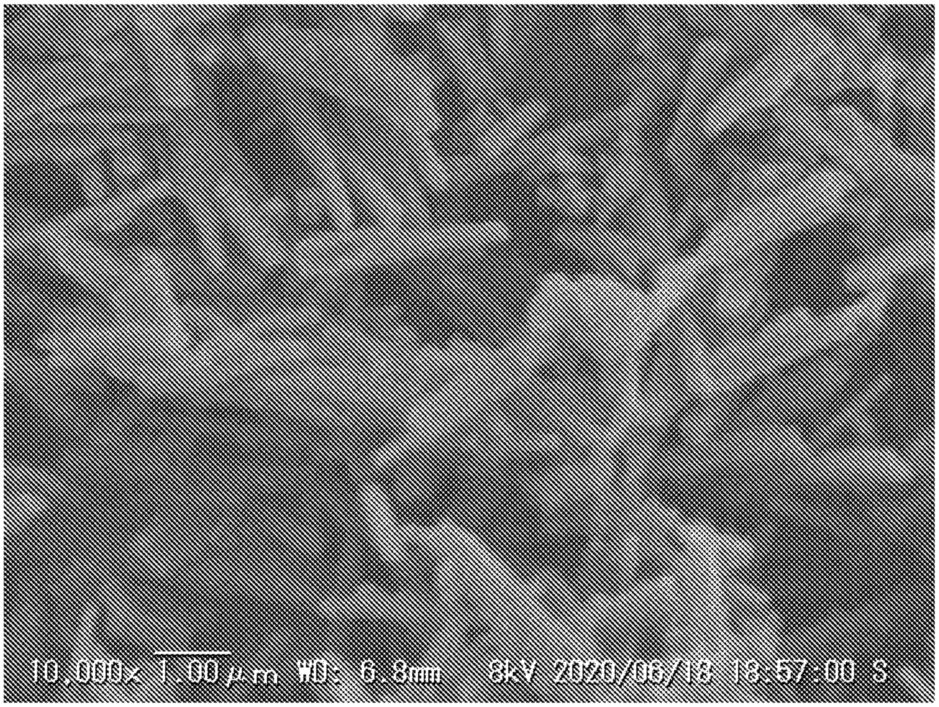
FIG. 5 is a SEM image of niobium oxide particles of EXAMPLE 5.
Figure 6:
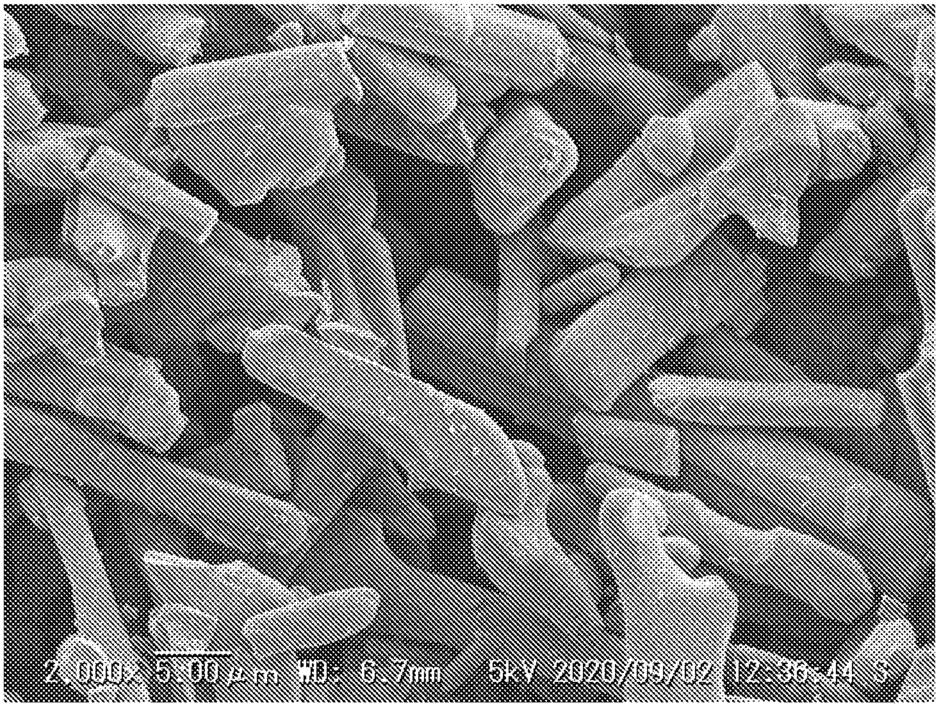
FIG. 6 is a SEM image of niobium oxide particles of EXAMPLE 7.
Figure 7:
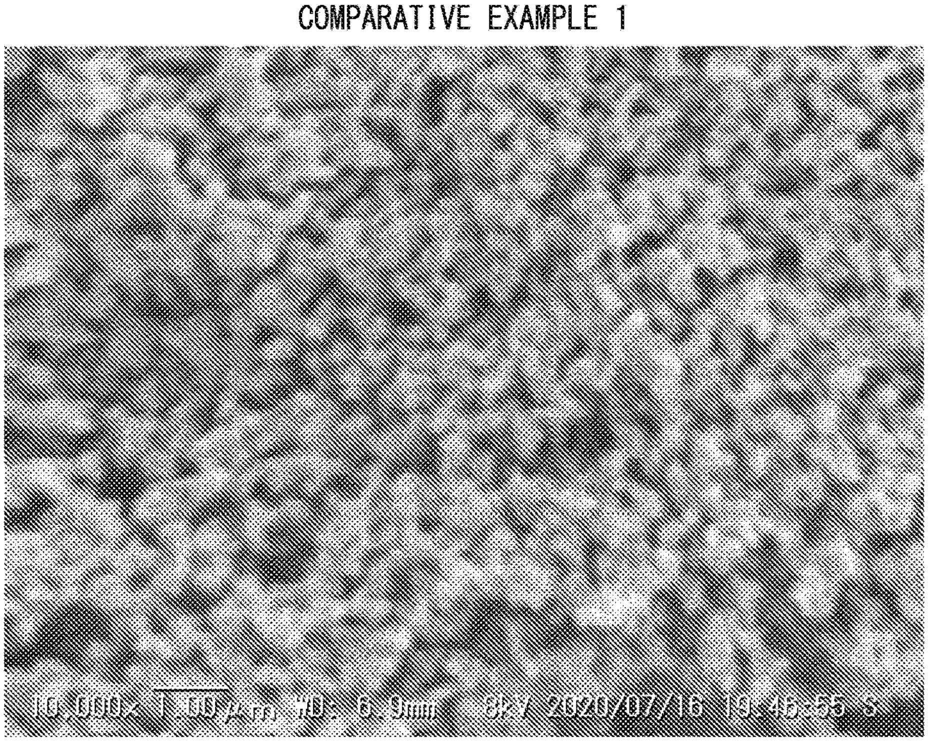
FIG. 7 is a SEM image of niobium oxide particles of COMPARATIVE EXAMPLE 1.
Figure 8:
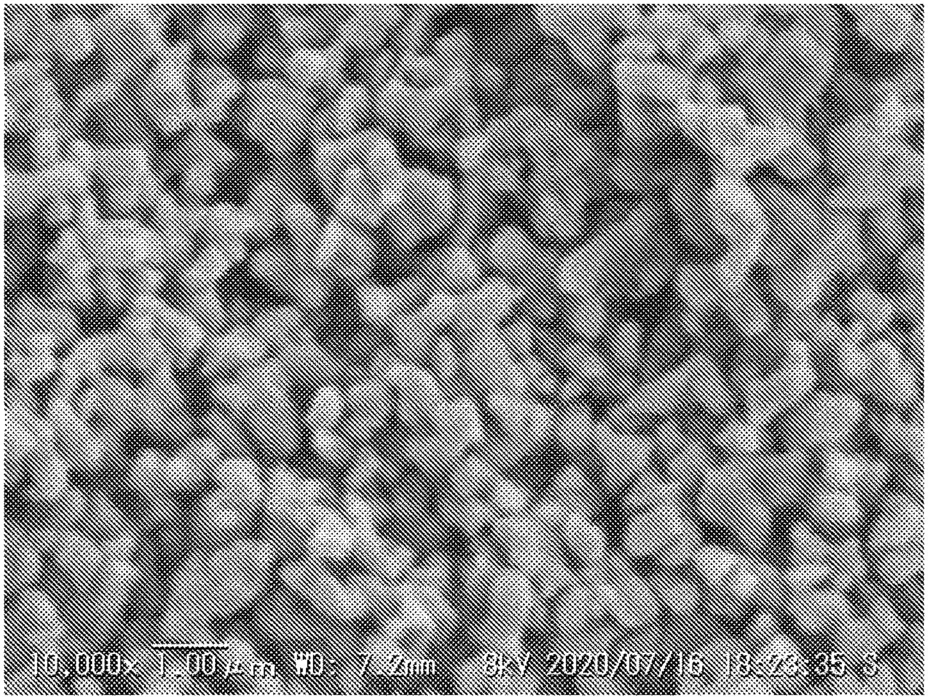
FIG. 8 is a SEM image of niobium oxide particles of COMPARATIVE EXAMPLE 2.

Hereinbelow, embodiments of niobium oxide particles and of methods for producing niobium oxide particles according to the present invention will be described.

[Niobium Oxide Particles]

Niobium oxide particles according to an embodiment include molybdenum.

The niobium oxide particles according to the present embodiment include molybdenum and have excellent characteristics stemming from molybdenum such as catalytic activity.

The niobium oxide particles according to the present embodiment may be produced with a controlled crystal shape by a production method described later while regulating the content and state in which molybdenum is present, so as to adjust properties and performance of the niobium oxide particles, for example, optical characteristics such as hue and transparency, as desired in accordance with the use application.

In the present specification, phrases such as "the crystal shape of niobium oxide particles is controlled" mean that the crystal shape of niobium oxide particles that are produced is not shapeless. In the present specification, phrases such as "the niobium oxide particles have a controlled crystal shape" mean that the crystal shape of the niobium oxide particles is not shapeless.

Niobium oxide particles in one embodiment produced by a production method according to an embodiment may have a particular idiomorphic shape such as polyhedral, columnar or acicular as will be described in EXAMPLES later.

The niobium oxide particles according to the present embodiment may have a polyhedral, columnar or acicular shape. The niobium oxide particles having such a shape may be produced by a production method described later. The niobium oxide particles that are obtained are more likely to be columnar or acicular with increasing amount of molybdenum used relative to niobium.

In the present specification, the term "polyhedral" means any tetrahedral or higher shapes. Hexahedral or higher shapes are preferable, octahedral or higher shapes are more preferable, and decahedral to triacontahedral shapes are still more preferable. The faces constituting the polyhedron may be flat faces or may be curved faces.

In the present specification, the term "columnar" means prismatic shapes, cylindrical shapes, rod shapes and the like. The column bottom shape of columnar niobium oxide particles is not particularly limited and may be, for example, circular, oval or polygonal. For example, the columns may extend straight in the longitudinal direction, may extend at a slant, may be curved, or may be branched.

In the present specification, the term "acicular" means that at least one end of the niobium oxide particle is tapered like a needle.

In the niobium oxide particles according to the present embodiment, the longer diameter is preferably 0.1 to 300 μm, more preferably 1.5 to 200 μm, still more preferably 2 to 100 μm, and particularly preferably 5 to 50 μm.

In the niobium oxide particles according to the present embodiment, the shorter diameter is preferably 0.01 to 50 μm, more preferably 0.2 to 40 μm, and still more preferably 0.05 to 10 μm.

In the present specification, the "longer diameter" of the niobium oxide particles is the length of the longer side of a rectangle circumscribed about the niobium oxide particle in a two-dimensional image captured with a scanning electron microscope (SEM) (the circumscribed rectangle is drawn so that the area thereof will be minimum). In the present specification, the "shorter diameter" of the niobium oxide particles is the length of a straight line connecting the farthest two points on the outer periphery of the photographed particle in the direction perpendicular to the longer diameter.

In the case of columnar or acicular niobium oxide particles, the particles may be roughly approximated as fibers, and the longer diameter corresponds to the fiber length and the shorter diameter to the fiber diameter. Depending on how the particles are directed in the image, the true longer diameter and shorter diameter of the particles may significantly differ from the values measured with respect to a two-dimensional image. Thus, in the case where the sample niobium oxide particles are mainly columnar or acicular shapes, those particles directly showing a face parallel to the longitudinal direction in the image are appropriately selected for dimensional measurement.

The longer diameter and the shorter diameter are arithmetic averages of at least fifty, randomly selected niobium oxide particles that are measured in the manner described above.

According to the production method described later, niobium oxide particles that are obtained tend to have a larger longer diameter and a larger shorter diameter with increasing amount of molybdenum used relative to niobium, and with increasing calcination temperature.

In the niobium oxide particles according to the present embodiment, the aspect ratio represented by longer diameter/shorter diameter is preferably not less than 2, more preferably 5 to 50, and still more preferably 7 to 30. For example, columnar or acicular niobium oxide particles have such an aspect ratio.

The longer diameter and the shorter diameter based on which the aspect ratio is measured may be values of the longer diameter and the shorter diameter described hereinabove.

According to the production method described later, niobium oxide particles that are obtained are more likely to be columnar or acicular and tend to have a higher aspect ratio with increasing amount of molybdenum used relative to niobium. Further, niobium oxide particles that are obtained are more likely to be columnar or acicular and tend to have a higher aspect ratio when the calcination temperature is low to some extent.

The niobium oxide particles according to the present embodiment may be provided as aggregates of niobium oxide particles. Such aggregates of the niobium oxide particles according to the present embodiment preferably include not less than 50%, more preferably not less than 70%, and still more preferably not less than 90% by number of particles that satisfy at least one of the longer diameter, the shorter diameter and the aspect ratio described above.

In the niobium oxide particles according to the present embodiment, the $MoO_3$ content ($M_1$) measured by XRF analysis of the niobium oxide particles is preferably not less than 0.1 mass % relative to the niobium oxide particles taken as 100 mass %, and is preferably 0.1 to 40 mass %, more preferably 1 to 35 mass %, and still more preferably 5 to 30 mass % relative to the niobium oxide particles taken as 100 mass %.

The niobium oxide particles that contain molybdenum in the above numerical range may effectively exhibit excellent characteristics stemming from molybdenum.

The niobium oxide particles may have a $MoO_3$ content ($M_1$) measured by XRF analysis of not less than 5 mass %, preferably not less than 7 mass %, relative to the niobium oxide particles taken as 100 mass %. Such niobium oxide particles are advantageously more likely to be columnar or acicular particles having a high aspect ratio.

The $MoO_3$ content ($M_1$) is a value measured by analyzing the niobium oxide particles by XRF (X-ray fluorescence) analysis with reference to a $MoO_3$ calibration curve prepared beforehand, and expressing the content of $MoO_3$ as the percentage of $MoO_3$ relative to 100 mass % of the niobium oxide particles.

From the similar viewpoint as described above, the niobium oxide particles according to the present embodiment preferably have a $MoO_3$ content ($M_2$) measured by XPS surface analysis of the niobium oxide particles of not less than 0.5 mass % relative to a superficial layer of the niobium oxide particles taken as 100 mass %. The $MoO_3$ content ($M_2$) is preferably 0.5 to 45 mass %, more preferably 10 to 43 mass %, and still more preferably 15 to 40 mass % relative to a superficial layer of the niobium oxide particles taken as 100 mass %.

The niobium oxide particles that contain molybdenum in the above numerical range may effectively exhibit excellent characteristics stemming from molybdenum.

The niobium oxide particles may have a $MoO_3$ content ($M_2$) measured by XPS surface analysis of, for example, not less than 10 mass % relative to a superficial layer of the niobium oxide particles taken as 100 mass %. Such niobium oxide particles are advantageously more likely to be columnar or acicular particles having a high aspect ratio.

The $MoO_3$ content ($M_2$) is a value measured by analyzing the surface of the niobium oxide particles by X-ray photoelectron spectroscopy (XPS) to determine the amounts (atom %) of elements, and converting the amount of molybdenum into $MoO_3$ oxide content relative to a superficial layer of the niobium oxide particles taken as 100 mass %.

In the niobium oxide particles according to the present embodiment, it is preferable that molybdenum be selectively rich in a superficial layer of the niobium oxide particles.

Here, the "superficial layer" indicates a region extending from the surface to a depth of 10 nm of the niobium oxide particles according to the present embodiment. This distance corresponds to the detection depth of XPS used in the measurement in EXAMPLES.

Here, the phrase "selectively rich in the superficial layer" means that the mass of molybdenum or a molybdenum compound per unit volume of the superficial layer is larger than the mass of molybdenum or a molybdenum compound per unit volume of regions other than the superficial layer.

In the niobium oxide particles according to the present embodiment, the superficial enrichment of molybdenum in the superficial layer of the niobium oxide particles may be identified by, as will be described in EXAMPLES later, confirming that the Mo content ($M_2$) measured by XPS surface analysis of the niobium oxide particles relative to 100 mass % of the superficial layer of the niobium oxide particles is higher than the Mo content ($M_1$) measured by XRF analysis of the niobium oxide particles relative to 100 mass % of the niobium oxide particles.

The superficial enrichment represented by the ratio ($M_2/M_1$) of the $MoO_3$ content ($M_2$) measured by XPS surface analysis of the niobium oxide particles to the $MoO_3$ content ($M_1$) measured by XRF analysis of the niobium oxide particles is preferably greater than 1, more preferably 1.01 to 8.0, still more preferably 1.03 to 6.0, and particularly preferably 1.10 to 4.0.

When molybdenum or a molybdenum compound is selectively rich in the superficial layer, excellent characteristics stemming from molybdenum may be effectively exhibited as compared to when molybdenum or a molybdenum compound is uniformly distributed in the superficial layer and also in the regions (the inside) other than the superficial layer.

Examples of the niobium oxides contained in the niobium oxide particles according to the present embodiment include niobium pentoxide ($Nb_2O_5$), niobium dioxide ($NbO_2$) and niobium monoxide (NbO). The niobium oxide particles may also include niobium oxides having any valence other than the niobium oxides of the oxidation numbers described above. Among those described above, the niobium oxide particles according to the present embodiment preferably include niobium pentoxide ($Nb_2O_5$).

In the niobium oxide particles according to the present embodiment, the content of $Nb_2O_5$ may be not less than 50 mass % relative to the niobium oxide particles taken as 100 mass %, and may be 60 to 99.9 mass %, may be 65 to 99 mass %, or may be 70 to 95 mass % relative to the niobium oxide particles taken as 100 mass %.

Many polymorphs of niobium pentoxide have been reported and known, such as T-phase (T-$Nb_2O_5$), M-phase (M-$Nb_2O_5$) and H-phase (H—$Nb_2O_5$) (for the XRD patterns of these phases, see, for example, J. Therm. Anal. calorim. (2017) 130: 77-83).

As will be described in EXAMPLES later, niobium oxide particles tend to include niobium pentoxides with M-phase (M-$Nb_2O_5$) and H-phase (H—$Nb_2O_5$). To ensure that niobium oxide particles having a high aspect ratio are provided, it is preferable that the niobium oxide particles according to the present embodiment include M-phase niobium pentoxide.

In the XRD analysis of the niobium oxide particles according to the present embodiment, the ratio (Mp/Hp) of the intensity (Mp) of a peak assigned to M-phase niobium pentoxide that is observed at near $2\theta=25.4°$ to the intensity (Hp) of a peak assigned to H-phase niobium pentoxide that is observed at near $2\theta=24.5°$ may be not less than 0.1, may be not less than 0.3, or may be not less than 0.6.

Columnar or acicular niobium oxide particles that satisfy the above ratio Mp/Hp may have a higher aspect ratio.

In the niobium oxide particles according to the present embodiment, the $Nb_2O_5$ content ($N_1$) measured by XRF analysis of the niobium oxide particles may be not less than 50 mass % relative to the niobium oxide particles taken as 100 mass %, and may be 60 to 99.9 mass %, may be 65 to 99 mass %, or may be 70 to 95 mass % relative to the niobium oxide particles taken as 100 mass %.

The $Nb_2O_5$ content ($N_1$) is a value measured by analyzing the niobium oxide particles by XRF (X-ray fluorescence) analysis with reference to a $Nb_2O_5$ calibration curve prepared beforehand, and expressing the content of $Nb_2O_5$ as the percentage of $Nb_2O_5$ relative to 100 mass % of the niobium oxide particles.

In the niobium oxide particles according to the present embodiment, the $Nb_2O_5$ content ($N_2$) measured by XPS surface analysis of the niobium oxide particles is preferably not less than 50 mass % relative to the superficial layer of the niobium oxide particles taken as 100 mass %, and may be 55 to 99.5 mass %, may be 57 to 90 mass %, or may be 60 to 88 mass % relative to the superficial layer of the niobium oxide particles taken as 100 mass %.

The $Nb_2O_5$ content ($N_2$) is a value measured by analyzing the surface of the niobium oxide particles by X-ray photoelectron spectroscopy (XPS) to determine the amounts (atom %) of elements, and converting the amount of niobium into $Nb_2O_5$ oxide content relative to the superficial layer of the niobium oxide particles taken as 100 mass %.

In the niobium oxide particles according to the present embodiment, the specific surface area measured by a BET method is preferably less than 10 $m^2/g$, more preferably not more than 9 $m^2/g$, still more preferably not more than 5 $m^2/g$, and even more preferably not more than 4 $m^2/g$.

The niobium oxide particles having a specific surface area that is less than or not more than the upper limit described above are advantageous in that the particle size is large and/or the particles are dense.

In the niobium oxide particles according to the present embodiment, the lower limit of the specific surface area measured by a BET method is not particularly limited, but may be, for example, not less than 0.01 $m^2/g$ and less than 10 $m^2/g$, may be 0.1 to 9 $m^2/g$, may be 0.2 to 5 $m^2/g$, or may be 0.2 to 4 $m^2/g$.

The niobium oxide particles according to the present embodiment may be provided as aggregates of niobium oxide particles, and the values of molybdenum content, niobium content and specific surface area may be values measured with respect to the aggregates as a sample.

For example, the niobium oxide particles according to the present embodiment may be produced by a method described later in [Niobium oxide particle production methods].

Incidentally, the niobium oxide particles of the present invention are not limited to those produced by the niobium oxide particle production method according to the embodiment described below.

The niobium oxide particles according to the present embodiment are highly useful in that they exhibit characteristics of both niobium oxide and molybdenum.

[Niobium Oxide Particle Production Methods]

A niobium oxide particle production method according to an embodiment is a method for producing the niobium oxide particles described above, and includes calcining a niobium compound in the presence of a molybdenum compound.

By the niobium oxide particle production method according to the present embodiment, it is possible to produce niobium oxide particles containing molybdenum which are described in one of the embodiments of the present invention hereinabove.

In the niobium oxide particle production method according to the present embodiment, the crystal shape of niobium oxide particles that are produced may be easily controlled by calcining a niobium compound in the presence of a molybdenum compound.

The niobium oxide particle production method preferably includes a step in which a niobium compound and a molybdenum compound are mixed together to form a mixture (a mixing step), and a step in which the mixture is calcined (a calcination step).

[Mixing Step]

In the mixing step, a niobium compound and a molybdenum compound are mixed together to form a mixture. The materials that are mixed will be described below.

[Niobium Compounds]

The niobium compound is not particularly limited as long as the compound may be calcined into a niobium oxide. Examples thereof include niobium oxides, niobium hydroxides, niobium sulfides, niobium nitrides, niobium halides such as niobium fluoride, niobium chloride, niobium bromide and niobium iodide, and niobium alkoxides. Niobium hydroxides and niobium oxides are preferable, and niobium oxides are more preferable.

Examples of the niobium oxides include niobium pentoxide ($Nb_2O_5$), niobium dioxide ($NbO_2$) and niobium monoxide (NbO). Use may be made of niobium oxides having any valence other than the niobium oxides of the oxidation numbers described above.

Physical properties such as shapes, particle sizes and specific surface areas of the niobium compounds as precursors are not particularly limited.

After calcination, the niobium compound used as a raw material does not substantially retain its shape before the calcination. Thus, any forms of the compounds such as, for example, spherical shapes, amorphous shapes, aspect structures (for example, wires, fibers, ribbons and tubes) and sheets may be favorably used.

[Molybdenum Compounds]

Examples of the molybdenum compounds include molybdenum oxides, molybdic acids and molybdenum sulfides. Molybdenum oxides are preferable.

Examples of the molybdenum oxides include molybdenum dioxide ($MoO_2$) and molybdenum trioxide ($MoO_3$), with molybdenum trioxide being preferable.

In the niobium oxide particle production method according to the present embodiment, the molybdenum compound is used as a flux. In the present specification, the production method using the molybdenum compound as a flux is sometimes written simply as the "flux method" hereinbelow. During the calcination, the molybdenum compound reacts with the niobium compound at a high temperature to form niobium molybdate, and the niobium molybdate is decomposed at a higher temperature into a niobium oxide and a molybdenum oxide probably in such a manner that a molybdenum compound is incorporated into the niobium oxide particles. The molybdenum oxide is sublimated and removed out of the system, and, during this process, the molybdenum compound and the niobium compound react with each other probably to form a molybdenum compound in the superficial layer of the niobium oxide particles. More specifically, the molybdenum compound that is included in the niobium oxide particles is probably formed by a mechanism in which molybdenum reacts with Nb atoms to form Mo—O—Nb in the superficial layer of the niobium oxide particles, and, by high-temperature calcination, Mo is detached while a molybdenum oxide or, for example, a compound having a Mo—O—Nb bond is formed in the superficial layer of the niobium oxide particles.

The molybdenum oxide that is not incorporated into the niobium oxide particles may be sublimated and recovered for reuse. In this manner, the amount of molybdenum oxide attached to the surface of the niobium oxide particles may be reduced to allow the niobium oxide particles to fully exhibit their inherent properties.

In the niobium oxide particle production method according to the present embodiment, the amounts in which the niobium compound and the molybdenum compound are added are not particularly limited. Preferably, a mixture may be prepared by mixing 35 mass % or more of the niobium compound and 65 mass % or less of the molybdenum compound with respect to 100 mass % of the mixture, the mixture being then calcined. More preferably, a mixture may be prepared by mixing not less than 40 mass % and not more than 99 mass % of the niobium compound and not less than 0.5 mass % and not more than 60 mass % of the molybdenum compound with respect to 100 mass % of the mixture, the mixture being then calcined. Still more preferably, a mixture may be prepared by mixing not less than 50 mass % and not more than 90 mass % of the niobium compound and not less than 2 mass % and not more than 50 mass % of the molybdenum compound with respect to 100 mass % of the mixture, the mixture being then calcined.

In the niobium oxide particle production method according to the present embodiment, the molar ratio molybdenum/niobium of the molybdenum atoms in the molybdenum compound to the niobium atoms in the niobium compound is preferably not less than 0.01, more preferably not less than 0.03, still more preferably not less than 0.05, and particularly preferably not less than 0.1.

The upper limit of the molar ratio of the molybdenum atoms in the molybdenum compound to the niobium atoms in the niobium compound may be determined appropriately. From the points of view of saving the amount of the molybdenum compound used and enhancing the production efficiency, for example, the molybdenum/niobium ratio may be not more than 5, may be not more than 3, may be not more than 1, or may be not more than 0.5.

For example, the molar ratio molybdenum/niobium of the molybdenum atoms in the molybdenum compound to the niobium atoms in the niobium compound is preferably in the range of 0.01 to 5, more preferably 0.03 to 3, still more preferably 0.05 to 1, and particularly preferably 0.1 to 0.5.

The niobium oxide particles that are obtained are more likely to be columnar or acicular and tend to have larger values of shorter diameter and longer diameter with increasing amount of molybdenum used relative to niobium. Further, the niobium oxide particles that are obtained tend to have a higher aspect ratio when the molar ratio of the molybdenum atoms in the molybdenum compound to the niobium atoms in the niobium compound is not more than the upper limit described above.

When the molar ratio molybdenum/niobium of the molybdenum atoms in the molybdenum compound to the niobium atoms in the niobium compound is 0.05 or above, columnar or acicular niobium oxide particles are obtained advantageously easily.

By using the compounds in the above ranges, the niobium oxide particles that are obtained contain a more appropriate amount of a molybdenum compound and easily attain a controlled crystal shape.

[Calcination Step]

In the calcination step, the mixture is calcined. The niobium oxide particles according to the aforementioned embodiment may be obtained by calcining the mixture. As already mentioned, this production method is called a flux method.

The flux method is classified as a solution method. More specifically, the flux method is a method of crystal growth which utilizes the fact that the crystal-flux binary phase diagram is eutectic. The mechanism of the flux method is probably as described below. When a mixture of a solute and a flux is heated, the solute and the flux form a liquid phase. Because the flux serves as a fusing agent during this process, in other words, the solute-flux binary phase diagram is eutectic, the solute melts at a temperature below its melting point to constitute a liquid phase. When the flux is evaporated in this state, the flux concentration is lowered, in other words, the flux's effect of lowering the melting point of the solute is reduced, and the evaporation of the flux drives the growth of solute crystal (flux evaporation method). Incidentally, the growth of solute crystal may be induced also by cooling the solute-flux liquid phase (slow cooling method).

The flux method offers advantages such as that a crystal may be grown at a temperature far below the melting point, that the crystal structure may be controlled precisely, and that an idiomorphic crystal may be formed.

In the production of niobium oxide particles using a molybdenum compound as a flux, the mechanism of the flux method is not fully understood but may be, for example, probably as described below. When a niobium compound is calcined in the presence of a molybdenum compound, niobium molybdate is formed first. During this process, as will be understood from the above description, the niobium molybdate grows into niobium oxide crystal at a temperature below the melting point of the niobium oxide. When, for example, the flux is evaporated, the niobium molybdate is decomposed and undergoes crystal growth to form niobium oxide particles. That is, the molybdenum compound functions as a flux and is involved in the production of niobium oxide particles in the intermediate form of niobium molybdate.

The calcination may be performed by any known method without limitation. The reaction between the niobium compound and the molybdenum compound to form niobium molybdate will occur at a calcination temperature of more than 650° C. When the calcination temperature is further elevated to 800° C. or above, the niobium molybdate will be decomposed, forming niobium oxide particles. During the process in which the niobium molybdate is decomposed into a niobium oxide and a molybdenum oxide, a molybdenum compound will be incorporated into the niobium oxide particles.

At the time of calcination, the niobium compound and the molybdenum compound may be in any state without limitation as long as the compounds are in the same space so that the molybdenum compound can act on the niobium compound. Specifically, the molybdenum compound and the niobium compound may be in the form of a simple mixture of respective powders, or may be in the form of a mixture obtained by mechanical mixing with a crusher or the like or a mixture obtained by mixing in a mortar or the like. The mixture may be a dry mixture or a wet mixture.

The calcination temperature is not particularly limited and may be determined appropriately in accordance with factors such as the particle size of the target niobium oxide particles, the formation of a molybdenum compound in the niobium oxide particles, and the shape of the niobium oxide particles. The calcination temperature may be a temperature close to the decomposition temperature of niobium molybdate, specifically, may be not less than 800° C., may be not less than 850° C., may be not less than 900° C., may be not less than 950° C., or may be not less than 1000° C.

The niobium oxide particles that are obtained are more likely to be columnar or acicular and tend to have a higher aspect ratio with increasing calcination temperature. To efficiently produce columnar or acicular niobium oxide particles having a high aspect ratio, the calcination temperature is preferably not less than 950° C., and more preferably not less than 1000° C.

In general, the shape of niobium oxide obtained after calcination is controlled by performing the calcination at a high temperature of more than 1500° C. close to the melting point of niobium oxide. Such a need is a big challenge for industrial use in terms of the burden on the calcination furnace and also fuel cost.

According to one embodiment of the present invention, niobium oxide particles may be formed efficiently at low cost even under conditions where, for example, the maximum calcination temperature during the calcination of the niobium compound is 1500° C. or below.

Further, the niobium oxide particle production method according to the present embodiment can form idiomorphic niobium oxide particles no matter the shape of the precursor even when the calcination temperature is as low as 1300° C. or less, far below the melting point of the niobium oxide. To efficiently produce columnar or acicular niobium oxide particles having a high aspect ratio, the calcination temperature is preferably not more than 1200° C., and more preferably not more than 1100° C.

For example, the calcination temperature at which the niobium compound is calcined in the calcination step may be in the range of 850 to 1500° C., may be 900 to 1400° C., may be 950 to 1300° C., may be 950 to 1200° C., or may be 950 to 1100° C.

From the point of view of production efficiency, the heat-up rate may be 20 to 600° C./h, may be 40 to 500° C./h, or may be 80 to 400° C./h.

The amount of calcination time is preferably such that the temperature is increased to the predetermined calcination temperature in 15 minutes to 10 hours and held at the calcination temperature for 5 minutes to 30 hours. To form niobium oxide particles efficiently, the holding time at the calcination temperature is more preferably 2 to 15 hours.

Idiomorphic niobium oxide particles containing molybdenum may be obtained easily by selecting a calcination temperature of 800 to 1600° C. and a holding time at the calcination temperature of 2 to 15 hours.

Columnar or acicular niobium oxide particles containing molybdenum may be obtained easily by selecting a calcination temperature of 900 to 1600° C. and a holding time at the calcination temperature of 2 to 15 hours.

The calcination atmosphere is not particularly limited as long as the advantageous effects of the present invention are obtained. For example, an oxygen-containing atmosphere such as air or oxygen, or an inert atmosphere such as nitrogen, argon or carbon dioxide is preferable. In light of cost, air atmosphere is more preferable.

The calcination apparatus is not necessarily limited, and a so-called calcination furnace may be used. The calcination furnace is preferably made of a material that does not react with the sublimate of molybdenum oxide. To ensure that the molybdenum oxide may be used efficiently, a highly hermetic calcination furnace is preferably used.

[Molybdenum Removal Step]

The niobium oxide particle production method according to the present embodiment may further include a molybdenum removal step as required in which at least part of molybdenum is removed after the calcination step.

As described hereinabove, molybdenum is sublimated during calcination. Thus, the molybdenum content in the superficial layer of the niobium oxide particles, and also the content and state of molybdenum present in the niobium oxide particles except the superficial layer (present in the inside) may be controlled by controlling conditions such as calcination time and calcination temperature.

Molybdenum may be attached to the surface of the niobium oxide particles. Other than by the sublimation described above, such molybdenum may be removed by washing with water, an aqueous ammonia solution, an aqueous sodium hydroxide solution or an acidic aqueous solution.

During this process, the molybdenum content in the niobium oxide particles may be controlled by appropriately changing conditions such as the concentration and amount of water, aqueous ammonia solution, aqueous sodium hydroxide solution or acidic aqueous solution that is used, portions that are washed, and the amount of washing time.

[Crushing Step]

The calcined product obtained through the calcination step is sometimes aggregates of niobium oxide particles that do not have a particle size suited for an intended use application. Thus, the niobium oxide particles may be crushed as required so as to satisfy the preferred range of particle size.

The calcined product may be crushed by any method without limitation. Known crushing devices such as ball mills, jaw crushers, jet mills, disc mills, Spectromills, grinders and mixer mills may be used.

[Classification Step]

The calcined product including niobium oxide particles that is obtained by the calcination step may be appropriately subjected to a classification treatment to control the range of particle size. The term "classification treatment" means an operation separating the particles into groups depending on the particle size.

The classification may be wet or dry classification. From the point of view of productivity, dry classification is preferable.

Dry classification techniques include sieve classification, and wind classification utilizing the difference in centrifugal force and fluid drag. From the point of view of classification accuracy, wind classification is preferable. Classification machines utilizing the Coanda effect such as airflow classifiers, swirling airflow classifiers, forced vortex centrifugal classifiers and semi-free vortex centrifugal classifiers may be used.

The crushing step and the classification step described above may be performed at any appropriate stages. By selecting whether or not or how to perform crushing and classification, for example, the average particle size of niobium oxide particles that are obtained may be controlled.

The niobium oxide particles according to the present embodiment, or niobium oxide particles obtained by the production method according to the present embodiment are preferably less aggregated or not aggregated because such particles can appropriately exhibit intrinsic properties and be handled more easily, and also can be dispersed more excellently when used as a dispersion in a dispersion medium.

Incidentally, the niobium oxide particle production method according to the present embodiment is capable of easily producing niobium oxide particles that are less aggregated or not aggregated, and is therefore advantageous in that desired niobium oxide particles having excellent properties can be produced with high productivity even without performing the crushing step or the classification step.

EXAMPLES

Next, the present invention will be described in greater detail by presenting EXAMPLES. However, it should be construed that the scope of the present invention is not limited to such EXAMPLES.

Comparative Example 1

Commercial niobium oxide ($Nb_2O_5$, a reagent manufactured by KANTO CHEMICAL CO., INC.) was used as a niobium oxide powder of COMPARATIVE EXAMPLE 1.

Example 1

A mixture was obtained by mixing 10 g of niobium oxide ($Nb_2O_5$, a reagent manufactured by KANTO CHEMICAL CO., INC.) and 0.5 g of molybdenum trioxide (manufactured by TAIYO KOKO CO., LTD.) in a mortar. The mixture obtained was added to a crucible and was calcined in an electric ceramic furnace at 1100° C. for 24 hours. After cooling, the crucible was recovered. Thus, a powder weighing 10.4 g was obtained.

Subsequently, 10.4 g of the powder obtained was dispersed in 100 mL of 0.5% aqueous ammonia. The dispersion solution was stirred at room temperature (25 to 30° C.) for 3 hours and was thereafter filtered to remove the aqueous ammonia. The filter cake was water washed and dried. Molybdenum that had remained on the particle surface was thus removed. In this manner 9.8 g of a powder of EXAMPLE 1 was obtained.

The synthesis conditions are described in Table 1.

Examples 2 and 3

Powders of EXAMPLES 2 and 3 were obtained in the same manner as in EXAMPLE 1, except that the amount of molybdenum trioxide used in EXAMPLE 1 was changed as described in Table 1.

Examples 4 to 7 and Comparative Example 2

Powders of EXAMPLES 4 to 7 and COMPARATIVE EXAMPLE 2 were obtained in the same manner as in EXAMPLE 1, except that the amount of molybdenum trioxide used in EXAMPLE 1 was changed as described in Table 1, and that the calcination temperature and the calcination time were changed as described in Table 1.

[Evaluation]

The powders of EXAMPLES and COMPARATIVE EXAMPLES as samples were tested by the following measurements.

[Measurement of Particle Size]

The sample powder was photographed with a scanning electron microscope (SEM). The longer diameter and the shorter diameter were measured with respect to the smallest units of particles (namely, the primary particles) captured on the two-dimensional image. The longer diameter was defined as the length of the longer side of a rectangle circumscribed about the photographed particle (the circumscribed rectangle was drawn so that the area thereof would be minimum). The shorter diameter was defined as the length of a straight line connecting the farthest two points on the outer periphery of the photographed particle in the direction perpendicular to the longer diameter.

In the case where the sample particles were mainly columnar or acicular shapes, those particles showing a face parallel to the longitudinal direction in the image were appropriately selected for dimensional measurement.

Fifty primary particles were measured as described above, and the results were arithmetically averaged.

Further, the ratio of the longer diameter to the shorter diameter (longer diameter/shorter diameter) was calculated as the aspect ratio of primary particles.

[Crystal Structure Analysis: XRD (X-Ray Diffractometry)]

The sample powder was loaded into a measurement sample holder having a depth of 0.5 mm. The sample was then set on a wide-angle X-ray diffractometer (XRD) (Ultima IV manufactured by Rigaku Corporation) and was analyzed using Cu/Kα radiation at 40 kV/40 mA, a scanning speed of 2°/min and a scanning range of 10 to 70°.

[XRF (X-Ray Fluorescence) Analysis]

Approximately 70 mg of the sample powder was placed on filter paper, and a PP film was overlaid thereon. The sample powder was then analyzed by XRF (X-ray fluorescence) analysis on X-ray fluorescence analyzer Primus IV (manufactured by Rigaku Corporation) under the following conditions.

Measurement Conditions:

EZ scan mode

Detection elements: F to U

Measurement time: Standard

Measurement diameter: 10 mm

Residue (balance): None

The $Nb_2O_5$ content ($N_1$) relative to 100 mass % of the niobium oxide sample powder, and the $MoO_3$ content ($M_1$) relative to 100 mass % of the niobium oxide particles were determined from the results of the XRF analysis.

[XPS Surface Analysis]

Using QUANTERA SXM manufactured by ULVAC-PHI, INCORPORATED, XPS (X-ray photoelectron spectroscopy) was performed using monochromatic Al-Kα as the X-ray source under the following conditions. The contents of elements in a superficial layer were determined as atom %.

X-Ray source: Monochromatic Al Kα, beam diameter: 100 μm, output: 25 W

Measurement: Area measurement (1000 μm squares), n=3

Charge correction: C1s=284.8 eV

To facilitate comparison with the XRF results, the niobium content in the superficial layer, and the molybdenum content in the superficial layer of the niobium oxide particles were converted into oxide contents.

Specifically, the $Nb_2O_5$ content ($N_2$) (mass %) relative to 100 mass % of the superficial layer of the niobium oxide particles, and the $MoO_3$ content ($M_2$) (mass %) relative to 100 mass % of the superficial layer of the niobium oxide particles were calculated.

The superficial enrichment was determined by calculating the ratio ($M_2/M_1$) of the $MoO_3$ content ($M_2$) measured by XPS surface analysis of the niobium oxide particles to the $MoO_3$ content ($M_1$) measured by XRF analysis of the niobium oxide particles.

[Measurement of Specific Surface Area]

The specific surface area of the niobium oxide sample powder was measured with a specific surface area meter (BELSORP-mini manufactured by MicrotracBEL). The surface area per g of the sample measured from the amount of nitrogen gas absorption according to a BET method was calculated as the specific surface area ($m^2/g$).

[Results]

Figure 9:
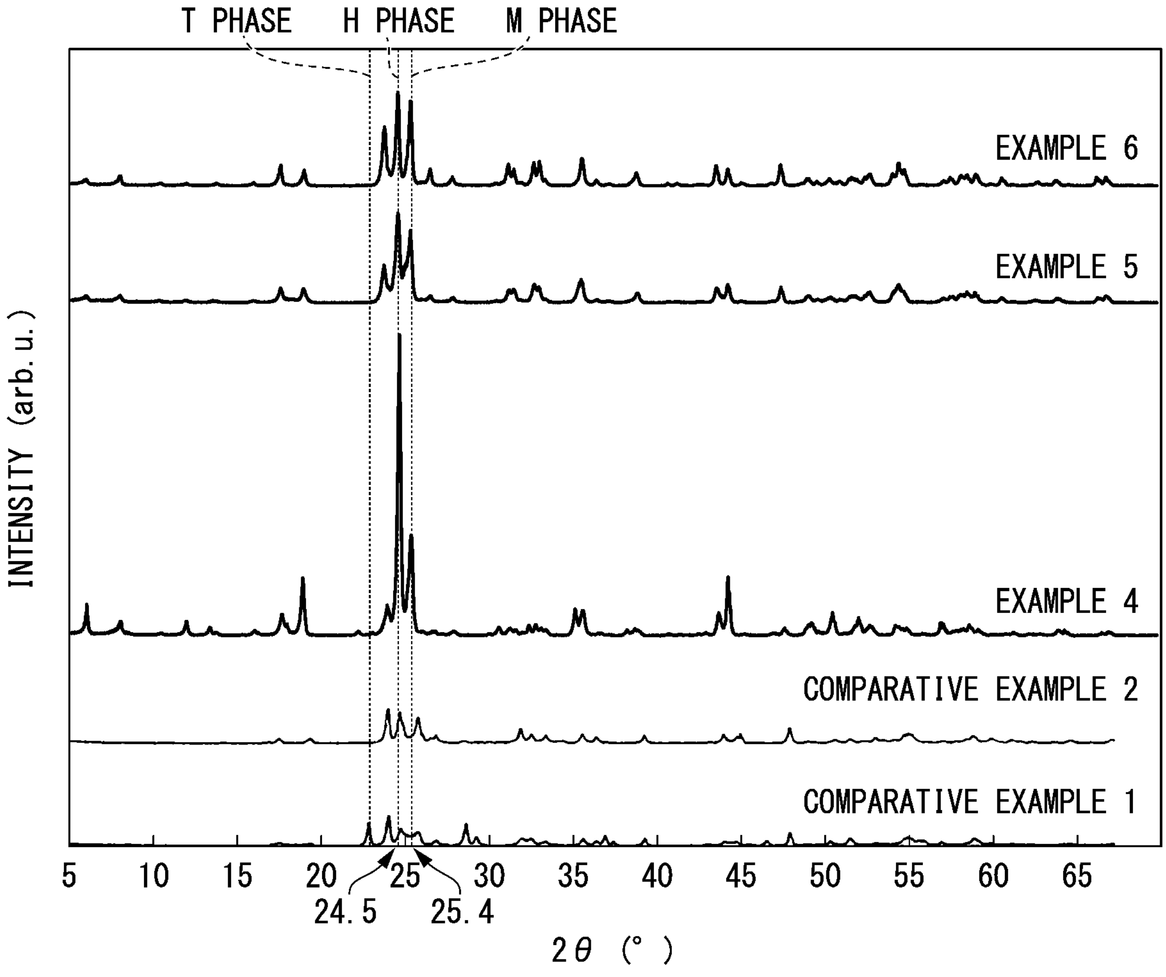
FIG. 9 illustrates X-ray diffraction (XRD) patterns of niobium oxide particles of EXAMPLES and COMPARATIVE EXAMPLES.
Figure 10:
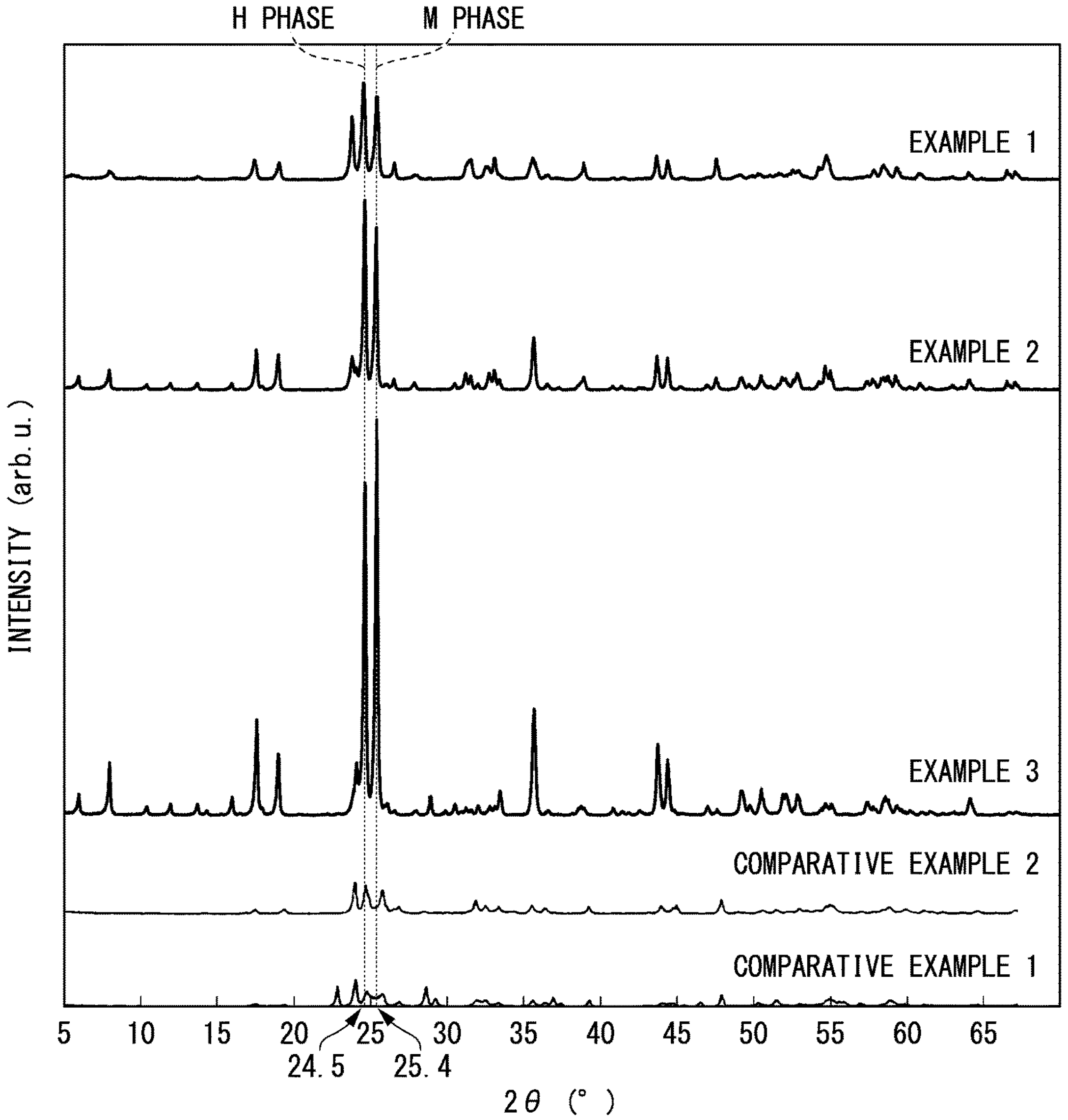
FIG. 10 illustrates X-ray diffraction (XRD) patterns of niobium oxide particles of EXAMPLES and COMPARATIVE EXAMPLES.
Figure 11:
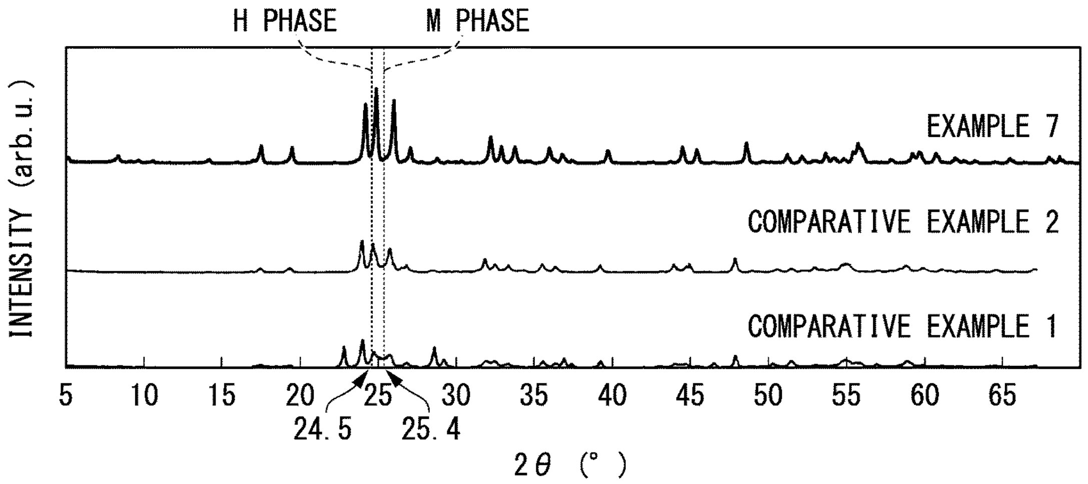
FIG. 11 illustrates X-ray diffraction (XRD) patterns of niobium oxide particles of EXAMPLE and COMPARATIVE EXAMPLES.

The results of XRD analysis are shown in FIGS. 9 to 11. The samples of EXAMPLES showed a peak assigned to a niobium oxide (niobium pentoxide) (see the peak of niobium pentoxide in the case of the raw material of COMPARATIVE EXAMPLE 1).

The niobium oxide particles of EXAMPLES 1 to 6 (calcination temperature: 900° C. or 1100° C.) obtained at a relatively low calcination temperature compared to EXAMPLE 7 (calcination temperature: 1300° C.) showed a clear peak assigned to M-phase niobium pentoxide at near $2\theta=25.4°$. Easy production of niobium oxide particles with a controlled columnar or acicular shape was thus confirmed.

In the columnar or acicular niobium oxide particles of EXAMPLES 2 to 5, the ratio (Mp/Hp) of the peak intensity (Mp) at near $2\theta=25.4°$ assigned to M-phase niobium pentoxide to the peak intensity (Hp) at near $2\theta=24.5°$ assigned to H-phase niobium pentoxide tended to be higher with increasing aspect ratio.

The results of the evaluation are described in Table 1. Incidentally, "N.D." is an abbreviation of "not detected" and indicates that no data was detected.

The results of EXAMPLES have shown that niobium oxide particles containing molybdenum can be produced even at a relatively low calcination temperature of 900° C. or 1100° C. by calcining a niobium compound in the presence of a molybdenum compound.

Further, it has been shown that the shape of niobium oxide particles that are produced can be controlled easily by calcining a niobium compound in the presence of a molybdenum compound.

From the comparison of EXAMPLES 1 to 3, the particles that were obtained tended to be columnar or acicular and to have a larger particle size and a higher aspect ratio with increasing amount of molybdenum used.

Similarly, the comparison of EXAMPLE 2 with EXAMPLE 5, and the comparison of EXAMPLES 3, 4 and 7 show that columnar or acicular particles having a high aspect ratio tended to be obtained at a calcination temperature of about 900 to 1100° C.

The niobium oxide particles of EXAMPLES 1 to 7 contain molybdenum on the surface and thus are expected to exhibit various actions such as catalytic activity stemming from molybdenum.

TABLE 1

| | | | | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|---|---|
| Production conditions | | $Nb_2O_5$ | g | 10 | 10 | 10 | 10 | 10 | 10 | 10 | — | 10 |
| | | $MoO_3$ | g | 0.5 | 2 | 10 | 10 | 2 | 1 | 10 | — | 0 |
| | | Mo/Nb | Molar ratio | 0.05 | 0.18 | 0.92 | 0.92 | 0.18 | 0.09 | 0.92 | — | 0 |
| | | Calcination temperature | ° C. | 1100 | 1100 | 1100 | 900 | 900 | 900 | 1300 | — | 900 |
| | | Calcination time | h | 24 | 24 | 24 | 10 | 10 | 10 | 10 | — | 10 |
| Evaluation | SEM | Shape | | Polyhedral | Columnar or acicular | Columnar or acicular | Columnar or acicular | Columnar or acicular | Granular | Columnar or acicular | Amorphous | Amorphous |
| | | Longer diameter | µm | 1.5 | 10 | 30 | 10 | 2 | 0.5 | 20 | Less than 0.5 | Less than 1.0 |
| | | Shorter diameter | µm | — | 2 | 3 | 4 | 0.2 | — | 5 | — | — |
| | | Longer diameter/shorter diameter aspect ratio | | — | 5 | 10 | 2.5 | 10 | — | 4 | — | — |
| | XRD | Mp/Hp | | 0.86 | 0.88 | 1.14 | 0.31 | 0.75 | 0.95 | N.D. | N.D. | N.D. |
| | XRF | $Nb_2O_5$ ($N_1$) | mass % | 94.9 | 91.3 | 87.3 | 76.3 | 89.0 | 90.9 | 96.0 | 100 | 100 |
| | | $MoO_3$ ($M_1$) | mass % | 4.8 | 8.52 | 10.4 | 20.4 | 10.9 | 9.0 | 3.2 | N.D. | N.D. |
| | XPS | $Nb_2O_5$ ($N_2$) | mass % | 95.0 | 80.5 | 69.1 | 52.9 | 87.2 | 89.5 | 95.7 | 100 | 100 |
| | | $MoO_3$ ($M_2$) | mass % | 5.0 | 19.5 | 30.9 | 47.1 | 12.8 | 10.5 | 4.3 | N.D. | N.D. |
| | | Superficial enrichment ratio $MoO_3$ ($M_2/M_1$) | | 1.04 | 2.29 | 2.97 | 2.3 | 1.19 | 1.17 | 1.34 | — | — |
| | | BET specific surface area | $m^2/g$ | 0.65 | 0.47 | 0.4 | 0.3 | 3.2 | 2.0 | 0.1 | 5.0 | 1.0 |

The SEM images of the powders obtained in EXAMPLES and COMPARATIVE EXAMPLES are illustrated in FIGS. 1 to 8.

The shapes of the particles of EXAMPLES and COMPARATIVE EXAMPLES determined from the SEM images are described in Table 1. When the particles were a mixture of different shapes, the major shape (the most frequent shape) was adopted. Particles having no specific shapes were judged as being amorphous.

The particles of EXAMPLE 1 probably included columnar or acicular particles but were described as being polyhedral which was the major shape.

The results of SEM observation and XRD analysis showed that the powders obtained in EXAMPLES and COMPARATIVE EXAMPLES were niobium oxide particles including niobium oxide.

In the niobium oxide particles of EXAMPLES 1 to 7, the molybdenum oxide content in the superficial layer of the niobium oxide particles determined by XPS surface analysis was higher than the molybdenum oxide content according to XRF analysis. This shows that molybdenum is selectively rich on the surface of the niobium oxide particles, and various actions stemming from molybdenum are expected to be produced effectively.

The configurations and combinations thereof, and other features described in the embodiments are only illustrative and may be combined with other configurations or may be omitted, replaced and changed without departing from the spirit of the present invention. Further, the scope of the present invention is not limited by the embodiments set out above, but is only limited by the claims.

The invention claimed is:

1. Niobium oxide particles comprising molybdenum oxide, wherein a $MoO_3$ content (M1), measured by XRF analysis, is 0.1 to 40 mass % based on 100 mass % of the niobium oxide particles, wherein the molybdenum oxide is enriched in a superficial layer of the niobium oxide particles, and wherein a superficial enrichment, represented by a ratio (M2/M1) of a $MoO_3$ content (M2) measured by XPS surface analysis to the $MoO_3$ content (M1), is 1.01 to 8.0.

2. The niobium oxide particles according to claim 1, wherein a longer diameter, defined as a length of a longer side of a rectangle circumscribed about a niobium oxide particle in a two-dimensional image captured with a scanning electron microscope (SEM), is 0.1 to 300 μm.

3. The niobium oxide particles according to claim 1, which have a polyhedral, columnar or acicular shape.

4. The niobium oxide particles according to claim 1, wherein an aspect ratio represented by a longer diameter/a shorter diameter determined from a two-dimensional SEM image is not less than 2.

5. The niobium oxide particles according to claim 1, wherein the $MoO_3$ content (M2) is 0.5 to 45 mass %.

6. The niobium oxide particles according to claim 1, wherein a specific surface area measured by a BET method is less than 10 $m^2/g$.

7. A method for producing the niobium oxide particles described in claim 1, comprising:

calcining a niobium compound in the presence of a molybdenum compound.

8. The method according to claim 7 for producing the niobium oxide particles, wherein the niobium compound is calcined at a calcination temperature of 800 to 1500° C.

9. The method according to claim 7 for producing the niobium oxide particles, wherein a molar ratio molybdenum/niobium of molybdenum atoms in the molybdenum compound to niobium atoms in the niobium compound is not less than 0.01.

* * * * *